(12) United States Patent
Frerichs et al.

(10) Patent No.: US 11,242,058 B2
(45) Date of Patent: Feb. 8, 2022

(54) METHOD FOR DETECTING A DRIVING STATE OF A VEHICLE

(71) Applicant: Bayerische Motoren Werke Aktiengesellschaft, Munich (DE)

(72) Inventors: Jan-Hinerk Frerichs, Munich (DE); Lutz Neumann, Neufahrn (DE); Matthias Reichler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 249 days.

(21) Appl. No.: 16/518,243

(22) Filed: Jul. 22, 2019

(65) Prior Publication Data
US 2019/0344793 A1    Nov. 14, 2019

Related U.S. Application Data

(63) Continuation of application No. PCT/EP2018/051924, filed on Jan. 26, 2018.

(30) Foreign Application Priority Data

Feb. 10, 2017  (DE) ..................... 10 2017 202 149.7

(51) Int. Cl.
*B60W 30/18*    (2012.01)
*B60W 10/04*    (2006.01)

(52) U.S. Cl.
CPC ...... *B60W 30/18072* (2013.01); *B60W 10/04* (2013.01); *B60W 2540/10* (2013.01)

(58) Field of Classification Search
CPC ................. B60W 30/00; B60W 30/18; B60W 30/18009; B60W 30/18072; B60W 10/00;
(Continued)

(56) References Cited

U.S. PATENT DOCUMENTS

| 2011/0040457 | A1* | 2/2011 | Bernhardt | ........... F02D 41/2474 |
| | | | | 701/49 |
| 2012/0053796 | A1* | 3/2012 | Fleming | ................ B60W 50/10 |
| | | | | 701/49 |
| 2015/0224975 | A1* | 8/2015 | Martin | .................. B60W 10/06 |
| | | | | 701/22 |
| 2015/0232098 | A1* | 8/2015 | Crombez | ............ F02D 41/2422 |
| | | | | 701/110 |

(Continued)

FOREIGN PATENT DOCUMENTS

CN           104973062 A    10/2015
DE    10 2013 218 786 A1    3/2015
(Continued)

OTHER PUBLICATIONS

International Search Report (PCT/ISA/210) issued in PCT Application No. PCT/EP2018/051924 dated May 8, 2018 with English translation (four (4) pages).
(Continued)

*Primary Examiner* — Geepy Pe
*Assistant Examiner* — Michael Allen Brace, Jr.
(74) *Attorney, Agent, or Firm* — Crowell & Moring LLP

(57) ABSTRACT

A method detects a driving state of a vehicle. The vehicle has a drive train with at least one drive and an accelerator pedal. A rest state of the accelerator pedal is determined by evaluating an operating point position of the accelerator pedal by a first accelerator pedal gradient in a first time interval, and checking whether the first accelerator pedal gradient within the first time interval is less than a maximum value.

8 Claims, 4 Drawing Sheets

(58) Field of Classification Search
CPC ............. B60W 10/04; B60W 2540/00; B60W 2540/10
See application file for complete search history.

(56) References Cited

U.S. PATENT DOCUMENTS

2015/0291167 A1    10/2015  Mair
2016/0200194 A1*   7/2016   Maruyama ........... B60K 26/021
                                                    74/512
2017/0217438 A1    8/2017   Iwamoto et al.

FOREIGN PATENT DOCUMENTS

| DE | 10 2014 224 677 A1 | 6/2016 |
| DE | 10 2015 006 281 A1 | 11/2016 |
| EP |       2 600 022 A1 | 6/2013 |
| WO |   WO 2016/021005 A1 | 2/2016 |

OTHER PUBLICATIONS

German-language Written Opinion (PCT/ISA/237) issued in PCT Application No. PCT/EP2018/051924 dated May 8, 2018 (six (6) pages).
German Search Report issued in counterpart German Application No. 10 2017 202 149.7 dated Dec. 19, 2017 with partial English translation (12) pages).
Chinese-language Office Action issued in Chinese Application No. 201880004506.6 dated Sep. 10, 2021 with English translation (13 pages).

\* cited by examiner

METHOD FOR DETECTING A DRIVING STATE OF A VEHICLE

CROSS REFERENCE TO RELATED APPLICATIONS

This application is a continuation of PCT International Application No. PCT/EP2018/051924, filed Jan. 26, 2018, which claims priority under 35 U.S.C. § 119 from German Patent Application No. 10 2017 202 149.7, filed Feb. 10, 2017, the entire disclosures of which are herein expressly incorporated by reference.

BACKGROUND AND SUMMARY OF THE INVENTION

The invention relates to a method for detecting a driving state of a vehicle and to a vehicle having a device for carrying out the method.

Vehicles with driver assistance devices are known. In such a vehicle, as in DE 10 2013 218 786 A1, a sailing signal relating to an active accelerator pedal is transmitted to the driver of the vehicle on the basis of the data of a navigation device, in that an opposing force is generated at the accelerator pedal. If the driver issues a corresponding acceptance signal, the vehicle goes into the sailing driving state. If the driver does not issue an acceptance signal, for example because he does not detect the opposing force at the accelerator pedal, the vehicle remains in the current driving state.

An object of the present invention is to provide a method, with the result that a driver's request is easily detected and a vehicle goes into a driving state.

By means of the inventive measures, a method for detecting a driving state of a vehicle is provided, wherein the vehicle comprises a drive train having at least one drive and an accelerator pedal. Firstly, an idle state of the accelerator pedal is determined, on the basis of the evaluation of an operating point position of the accelerator pedal by way of a first accelerator pedal gradient in a first time interval, and on the basis of checking whether the first accelerator pedal gradient within the first time interval is lower than a maximum value.

The inventive method which makes it possible to detect a driver's request which is intentionally or unintentionally indicated by the driver, and to place the vehicle in the corresponding driving state, is distinguished by the fact that a stabilized driving situation which is indicated by the driver is sensed. The determination of the idle state of the accelerator pedal, or in other words an accelerator pedal idle detection, comprises here firstly the evaluation of the operating point position of the accelerator pedal. This is done by an evaluation of the first accelerator pedal gradient. The accelerator pedal gradient is the time-dependent change in the load position of the accelerator pedal. Or in other words, the dynamics of the accelerator pedal, i.e. the changing of the position of the accelerator pedal within the first time interval. An actual value, a total value and the maximum and minimum values of the first accelerator pedal gradient are determined. For example, the accelerator pedal gradient can be determined as a continuous gradient total buffer, i.e. the total of all the accelerator pedal gradients during the first time interval. The first driving accelerator pedal gradient which is calculated in this way is then compared with a maximum permissible value. If the first accelerator pedal gradient is lower than the maximum permissible value, an idle state of the accelerator pedal is present.

One advantageous development of the method comprises detecting a load reduction at the accelerator pedal, evaluation of a load reduction behavior by way of a second accelerator pedal gradient and/or accelerator pedal position within a second time interval, and determining the driving state by way of the second accelerator pedal gradient and/or the accelerator pedal position.

As soon as an idle state of the accelerator pedal has been determined it is detected whether a load reduction is present at the accelerator pedal. The load reduction behavior of the driver is then evaluated by means of a second accelerator pedal gradient and/or the accelerator pedal position within a second time interval. The driving state is determined by way of the second accelerator pedal gradient and/or the accelerator pedal position. In this context, the intentional or unintentional request of the driver of the vehicle is explicitly detected.

The designation first accelerator pedal gradient is used in order to clarify that the accelerator pedal gradient is calculated in the first time interval, wherein the first time interval comprises the duration of the idle state of the accelerator pedal up to the current operating point. In other words, in this first time interval the total of the changes in the accelerator pedal does not exceed a predefined total value. The designation second accelerator pedal gradient is used to clarify that this accelerator pedal gradient is present in the second time interval, specifically from the start to the end of the load reduction. The calculation of the second accelerator pedal gradient is described below.

An average value of the accelerator pedal gradients which occur is formed for the evaluation of the load reduction behavior within the second time interval. In addition, the maximum occurring gradient, that is to say the greatest change in the accelerator pedal position, during the load reduction in the second time interval is also multiplied by the load reduction travel, and the average value of the accelerator pedal gradient is superimposed on said gradient. That is to say, if the average value of the accelerator pedal gradient which is calculated in this way lies within a range of permissible maximum and minimum gradients and if a maximum occurring gradient is not exceeded, the corresponding new driving state which corresponds to the driver's request is detected.

For example, a driver's request of sailing can be determined in order to bring about a driving state of sailing of the vehicle. That is to say the intentional or even unintentional request of the driver to enter the driving state of sailing. However, with the method according to the invention it is also possible to detect the operating strategy of engine start/stop or pure electric driving. A further driving state is, for example, an energy saving mode by way of a correspondingly efficient gear speed selection. Furthermore, the driving state can influence an operating strategy of an energy management system or acoustic drive effects, e.g. activation of an active sound design. For example, the permissible maximum gradients and minimum gradients, the gradient total buffer for the various driving states can vary. In other words, for an efficient gear speed selection it will be possible to undershoot a different maximum value for the gradient total buffer when the idle state of the accelerator pedal is detected than when an engine start/stop mode is detected.

The method provides in one advantageous development that the determination of the driving state is independent of the movement of the accelerator pedal and/or of the load reduction behavior within the second time interval.

As long as the second accelerator pedal gradient does not exceed or undershoot the predefined limits for a driving state, the type of dynamics of the load reduction which corresponds to the second accelerator pedal gradient is substantially irrelevant, or irrelevant. This has the advantage that in contrast to the known methods, for example a discontinuous profile, also referred to as shudder, of the accelerator pedal signal (e.g. as result of influences of the underlying surface) or a continuous slight movement of the accelerator pedal by the driver, does not have any influence on the detection of the driving state. Whether a load reduction takes place quickly, for example as result of rapid movement of the accelerator pedal or whether the driver moves the accelerator pedal slowly, does not have any influence on the determination of the driving state.

Another advantageous development provides that the second time interval comprises the time from the start of the load reduction up to when a zero load of the accelerator pedal is reached. This is significant, in particular, in such driving states in which the vehicle is not driven on the engine side, and the vehicle is in a driving state with an open drive train. For example, the driving state of sailing is reached only in the case of zero load.

In another advantageous development there is provision that the first and second accelerator pedal gradients are evaluated by an operating-point-specific evaluation.

In the case of an operating-point-specific evaluation, the operating point position is dependent on the accelerator pedal position and the speed of the vehicle. The accelerator pedal gradient values are filtered as a function of the operating point position of the accelerator pedal, for example by use of a low pass filter. In this context, the weighting can be adapted as a function of the accelerator pedal position and the vehicle speed.

A further aspect of the invention comprises a vehicle which comprises a drive train having at least one drive and an accelerator pedal, wherein the vehicle comprises a device for carrying out the described method for detecting a driving state of a vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
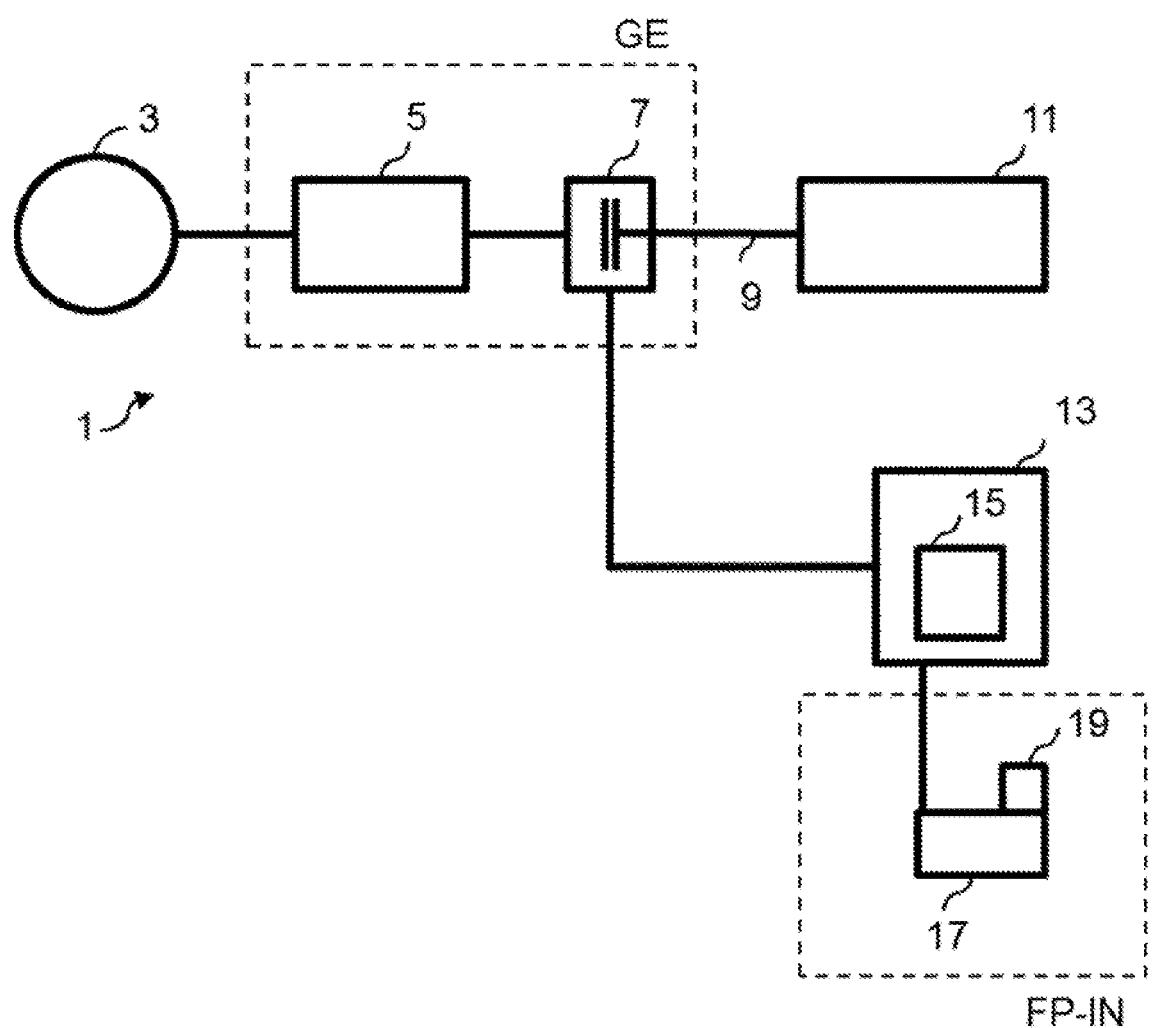
FIG. 1 is a schematic block diagram of a drive train of a vehicle.

FIG. 1 illustrates a drive train 1 of a vehicle. The force which is generated by an engine 11 is transmitted by means of the drive train 1, via a clutch 7 to a gear mechanism 5 and from there to wheels 3 of the vehicle. The gear mechanism 5 and the clutch 7 form a gear mechanism unit GE. The engine 11 drives a shaft 9. The clutch 7 has clutch discs which can be moved and separated from one another. The clutch 7 is connected to a control device 13 which is connected to the clutch 7 and to an accelerator pedal 17.

Furthermore, a sensor 19 is provided which is connected to the control device 13. The control device communicates with the clutch 7 via an interface (not shown), and passes on control signals to said clutch 7.

The control device 13 comprises a detection unit 15 which is configured to detect a driver's request and associated vehicle state. The control device 13 and the detection unit 15 form a control unit. The method according to the invention is implemented in the detection unit 15 and is carried out thereby.

The driver's request is indicated by the driver by means of the accelerator pedal 17. The accelerator pedal information FP-IN is passed on to the control unit by way of the accelerator pedal 17 and the sensor 19. If it is detected by the detection unit 15 that a driver's request is present and a corresponding driving state is determined, the control device 13 outputs a corresponding instruction to the drive train 1 via interfaces.

Figure 2:
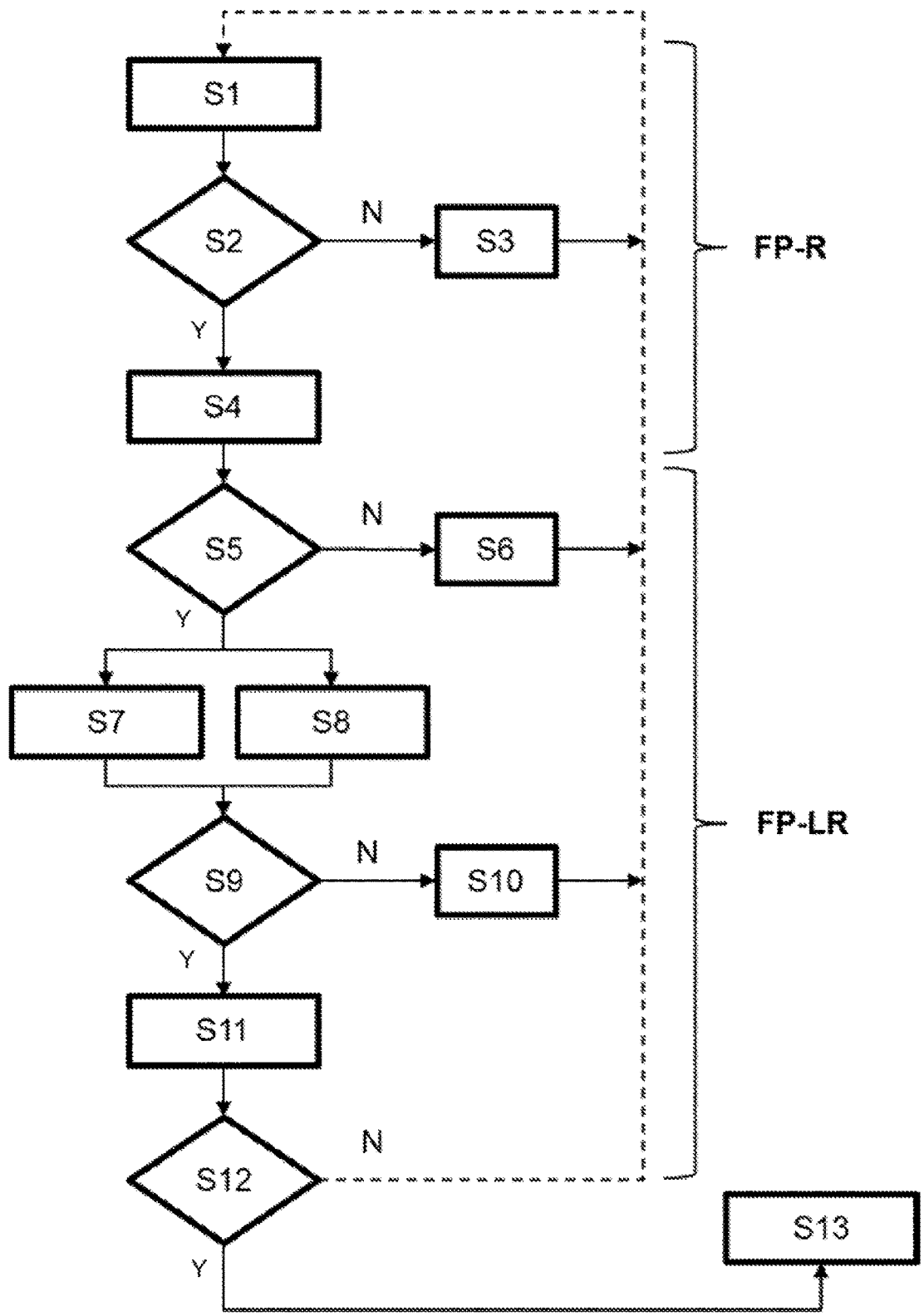
FIG. 2 is a flow diagram according to the inventive method.

FIG. 2 shows a flow diagram according to the invention. Firstly, the idle state of the accelerator pedal FP-R is determined. This comprises evaluating the operating point position of the accelerator pedal 17 by way of a first accelerator pedal gradient F1 in a first time interval (step S1). For this purpose, the detection unit 15 processes signals which the control device 13 receives from the sensor 19.

If the check (step S2) reveals that the first accelerator pedal gradient F1 within the first time interval is lower than a maximum value F1-max, i.e. F1<F1-max, the detection unit 15 detects an idle state of the accelerator pedal 17 (step S4). In other words, the first accelerator pedal gradient F1 is below the maximum value during the entire first time interval. If the accelerator pedal gradient F1 is above a maximum value at least once during the first time interval, an idle state of the accelerator pedal 17 is not detected (step S3) and the vehicle remains in the current driving state. The method continues at step S1, where the operating point position of the accelerator pedal 17 is evaluated again.

The operating point position of the accelerator pedal 17 is sensed via the interface of the control device 13. This sensing takes place continuously. If the driver of the vehicle relieves the loading on the accelerator pedal 17 to below an accelerator pedal threshold or torque threshold, the detection unit 15 can detect a load reduction LR (step S5). If a load reduction LR is not detected, the detection unit 15 detects an unchanged driving state and the vehicle remains in the current driving state (step S6). In other words, the driver does not indicate a request for a specific new driving state either intentionally or unintentionally. If, on the other hand, the detection unit 15 detects a load reduction LR, the evaluation of the load reduction behavior is carried out by way of a second accelerator pedal gradient and/or the accelerator pedal position within a second time interval.

For the evaluation of the load reduction behavior within the second time interval, an average accelerator pedal gradient value is formed (step S7). The latter is determined in the spanned time interval by considering only the initial value and the final value of the load reduction (cf. FIGS. 3-5, T-LA to T-LE) and the time required to reach the lower load threshold of the accelerator pedal. The real load reduction behavior of the driver in this time interval up to when the lower load threshold is reached plays only a subordinate role or even no role at all here. In addition, the maximum occurring gradient of the accelerator pedal during the second time interval is determined (step S8). In step S9 it is checked whether the maximum occurring gradient of the accelerator pedal is below a maximum value, or the average value of the accelerator pedal gradient is within the permissible range.

The maximum occurring gradient (absolute value) of the load reduction in the second time interval is multiplied by the load reduction travel (step S11), and the average accelerator pedal gradient value is superimposed on said gradient. If the average value which is determined in this way for the second accelerator pedal gradient lies within a range of permissible maximum gradients and minimum gradients (step S12), the corresponding driving state is determined (step S13).

If the average value for the second accelerator pedal gradient is not in the permissible range, a new driving state is not detected (step S10). The same also applies to the average value on which the gradient of the load reduction is superimposed.

Figure 3:
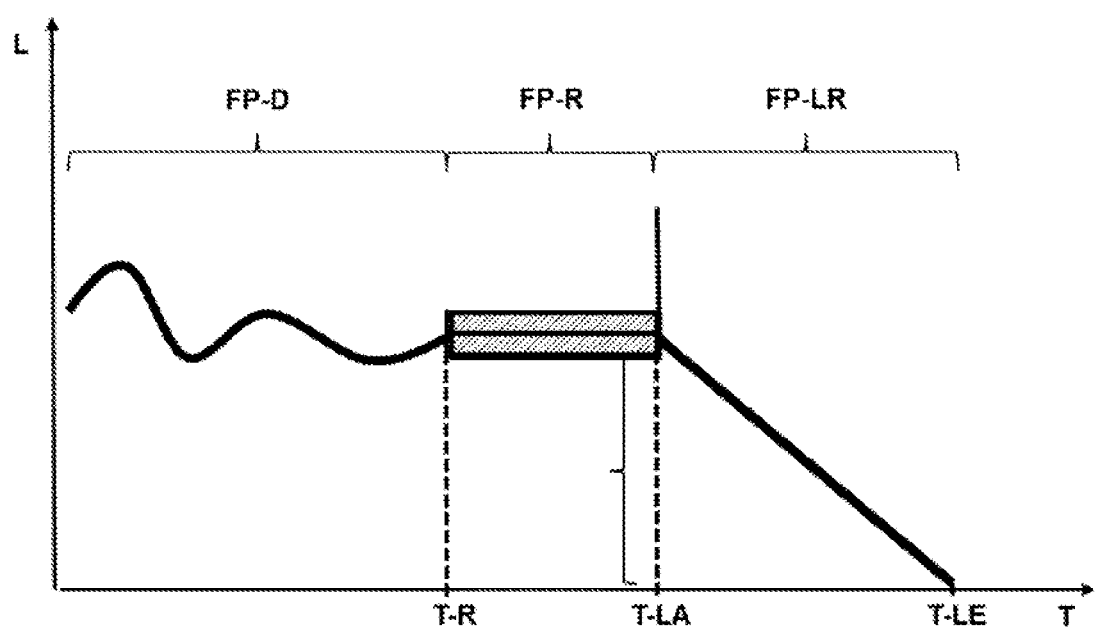
FIG. 3 is a first exemplary embodiment of a driving state detection.
Figure 4:
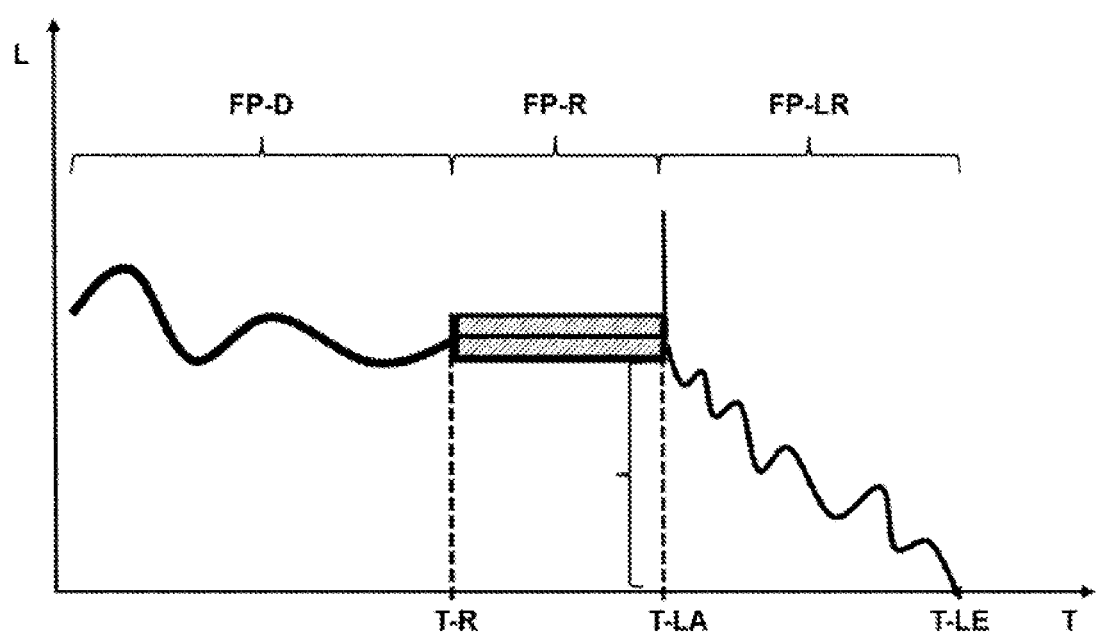
FIG. 4 is a second exemplary embodiment of a driving state detection.
Figure 5:
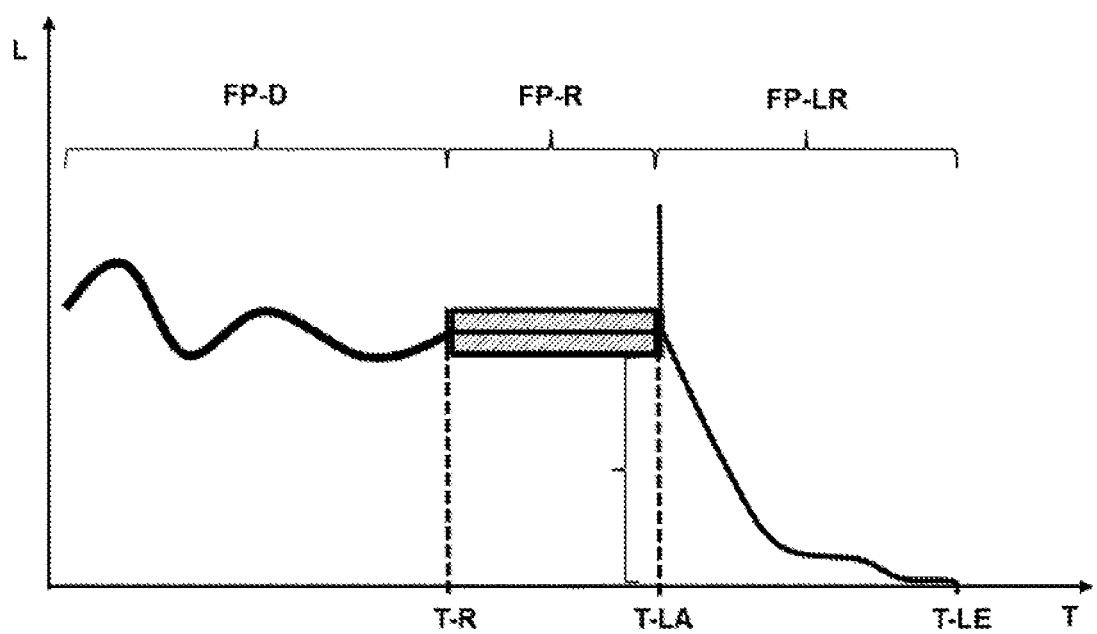
FIG. 5 is a third exemplary embodiment of a driving state detection.

In FIGS. 3 to 5, the time profile for the detection of a driving state of a vehicle is shown on the horizontal axis in three different exemplary embodiments. In FIGS. 3-5, the request of the driver for the driving state of sailing is respectively explicitly determined. In the driving state of sailing, the vehicle is not driven on the motor side and is in a driving state with an open drive train. The driving state of sailing is reached at zero load.

The exemplary embodiments differ, however, in the type of load reduction LR at the accelerator pedal. Both the first time intervals from T-R to T-LA and the second time intervals from T-LA to T-LE in the figures can also comprise different time periods or can be the same.

In FIG. 3, a continuous load reduction LR is present at the accelerator pedal 17. In FIG. 4, the load L at the accelerator pedal 17 changes in such a way that it suddenly drops and rises again. In FIG. 5, the load L firstly drops very quickly, that is to say load reduction LR, before slowly moving into a state of zero load at the end T-LE of the second time interval.

In all of the FIGS. 3-5, the respective load L at the accelerator pedal 17 is indicated on the vertical axis. The axis for the load extends from 0% to 100%, wherein 0% is zero load, and 100% is full load. The illustrated time interval from T-R via T-LA to T-LE comprises a few seconds, for example fewer than 5 seconds. In all three exemplary embodiments, the accelerator pedal 17 changes its position, with the result that a change in load is present. Before the occurrence of the idle state of the accelerator pedal FP-R, a dynamic of the accelerator pedal FP-D is present.

In the first time interval from T-R to T-LA, an idle state of the accelerator pedal FP-R is present. This is determined as described in steps S1-S4 in FIG. 2.

After the idle state of the accelerator pedal FP-R has been detected, there is a subsequent load reduction LR in the second time interval from T-LA to T-LE, as shown in FIGS. 3-5. This section is referred to as an accelerator pedal load reduction FP-LR. Firstly, a load reduction LR is detected (cf. FIG. 2, steps S5) which evaluates the load reduction behavior (cf. FIG. 2, steps S7-S12) and the driving state is determined (cf. FIG. 2, steps S13).

The driving state of sailing is determined independently of the load reduction LR at the accelerator pedal 17 in the three described exemplary embodiments in FIGS. 3-5.

In FIG. 3, the load L is reduced continuously after the first time interval in which the idle state FP-R of the accelerator pedal 17 was determined. This is achieved, for example, by virtue of the fact that the driver of the vehicle quickly takes his foot off the accelerator pedal 17 in a movement. The detection unit 15 determines the driver's request, as described in FIG. 2, as a request for an entry into sailing. Starting from the time T-LE, the vehicle is operated in the driving state of sailing.

In FIG. 4, the load L at the accelerator pedal 17 changes to ensure that it drops suddenly and rises again. The driver's request therefore cannot be recognized as unambiguously as in FIG. 3. However, the detection unit 15 also detects the rather implicit request of the driver to change into the driving state of sailing.

In FIG. 5, the load L initially decreases very quickly, that is to say the load reduction LR, in order to change slowly into a state of zero load at the end T-LE of the second time interval. The driver quickly depresses the accelerator pedal 17, but does not release it, and the load L for the first time does not become zero. Instead, the detection unit 15 is also configured by means of the method according to the invention in such a way that the driver's request, expressed in a somewhat hesitant fashion, to sail is recognized and the vehicle changes into the driving state of sailing.

In summary it is to be noted that the described measures stipulate a method by means of which stabilized driving situations can easily be detected by firstly determining an idle state of the accelerator pedal of a vehicle and then, when the load reduction is present, detecting the driving state which the driver expresses intentionally or unintentionally by means of the driving behavior. Both the determination of the idle state of the accelerator pedal and the load reduction behaviors is evaluated by means of accelerator pedal gradients, as described according to the invention.

It is to be noted that the methods, devices and systems which are described in this document can be used both alone as well as in combination with other methods, devices and systems which are described in this document. Furthermore, any aspects of the methods, device and systems which are described in this document can be combined with one another in a variety of ways.

LIST OF REFERENCE SYMBOLS

1 Drive train
3 Wheels
5 Gear mechanism
7 Clutch
9 Shaft
11 Engine
13 Control device
15 Detection unit
17 Accelerator pedal
19 Sensor
GE Gear mechanism unit
FP IN Accelerator pedal information
L Load
FP R Idle state of accelerator pedal
FP D Dynamic of accelerator pedal
FP LR Load reduction of accelerator pedal
T R Start of idle state
T LA Start of load reduction
T LE End of load reduction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for detecting a driving state of a vehicle, wherein the vehicle comprises a drive train having at least one drive and an accelerator pedal, the method comprising:

determining, by a control unit, an idle state of the accelerator pedal by:
  (i) evaluating an operating point position of the accelerator pedal based on a first accelerator pedal gradient in a first time interval, wherein the first accelerator pedal gradient is determined based on signals received from a sensor that is coupled to the accelerator pedal, and
  (ii) checking whether the first accelerator pedal gradient within the first time interval is lower than a first maximum value,
detecting, by the control unit, a load reduction at the accelerator pedal,
evaluating, by the control unit, load reduction behavior by:
  (i) determining an average second accelerator pedal gradient and a maximum occurring gradient of the accelerator pedal within a second time interval, and
  (ii) checking whether the average second accelerator pedal gradient within the second time interval is within a range of values, or whether the maximum occurring gradient of the accelerator pedal within the second time interval is lower than a second maximum value, and
determining, by the control unit, the driving state of the vehicle based on the average second accelerator pedal gradient and the maximum occurring gradient of the accelerator pedal within the second time interval.

2. The method according to claim 1, wherein
the determination of the driving state is independent of movement of the accelerator pedal and/or of the load reduction behavior within the second time interval.

3. The method according to claim 1, wherein
the second time interval comprises a time from a start of the load reduction up to when a zero load of the accelerator pedal is reached.

4. The method according to claim 1, wherein
the first and second accelerator pedal gradients are evaluated by an operating-point-specific evaluation.

5. A vehicle comprising:
a drive train having at least one drive;
an accelerator pedal; and
a control unit operatively configured to:
  determine an idle state of the accelerator pedal by:
    (i) evaluating an operating point position of the accelerator pedal based on a first accelerator pedal gradient in a first time interval, wherein the first accelerator pedal gradient is determined based on signals received from a sensor that is coupled to the accelerator pedal, and
    (ii) checking whether the first accelerator pedal gradient within the first time interval is lower than a first maximum value,
  detect a load reduction at the accelerator pedal,
  evaluate load reduction behavior by:
    (i) determining an average second accelerator pedal gradient and a maximum occurring gradient of the accelerator pedal within a second time interval, and
    (ii) checking whether the average second accelerator pedal gradient within the second time interval is within a range of values, or whether the maximum occurring gradient of the accelerator pedal within the second time interval is lower than a second maximum value, and
  determine the driving state of the vehicle based on the average second accelerator pedal gradient and the maximum occurring gradient of the accelerator pedal within the second time interval.

6. The vehicle according to claim 5, wherein
the determination of the driving state is independent of movement of the accelerator pedal and/or of the load reduction behavior within the second time interval.

7. The vehicle according to claim 5, wherein
the second time interval comprises a time from a start of the load reduction up to when a zero load of the accelerator pedal is reached.

8. The vehicle according to claim 5, wherein
the first and second accelerator pedal gradients are evaluated by an operating-point-specific evaluation.

* * * * *